US007356372B1

(12) United States Patent
Duncan et al.

(10) Patent No.: US 7,356,372 B1
(45) Date of Patent: *Apr. 8, 2008

(54) FACILITIES MANAGEMENT SYSTEM WITH PROGRAMMABLE LOGIC CONTROL

(75) Inventors: David Duncan, Edmonds, WA (US); Timothy A. Johns, Lynnwood, WA (US); Ray Sharif, Lake Forest Park, WA (US); John Seghers, Woodinville, WA (US); Eugene Chigirinsky, Seattle, WA (US); Greg McKay, Shoreline, WA (US)

(73) Assignee: Global Network Security, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/651,853

(22) Filed: Aug. 29, 2003

Related U.S. Application Data

(60) Provisional application No. 60/428,555, filed on Nov. 21, 2002.

(51) Int. Cl.
  *G05B 15/00* (2006.01)
  *G00B 29/00* (2006.01)
  *G06F 7/00* (2006.01)
  *G08B 1/08* (2006.01)

(52) U.S. Cl. .................. 700/83; 340/539.16; 340/506; 709/223; 709/224; 709/225; 707/10

(58) Field of Classification Search .................. 700/83; 600/300; 709/217, 223, 224; 340/539.16, 340/506; 715/700–866; 707/10
See application file for complete search history.

(56) References Cited

U.S. PATENT DOCUMENTS

| | | | |
|---|---|---|---|
| 4,689,610 A | 8/1987 | Dietrich | |
| 4,816,658 A | 3/1989 | Khandwala et al. | |
| 4,839,640 A | 6/1989 | Ozer et al. | |
| 5,263,158 A | 11/1993 | Janis | |
| 5,295,062 A * | 3/1994 | Fukushima | 700/83 |
| 5,319,362 A | 6/1994 | Hyatt, Jr. | |
| 5,428,555 A * | 6/1995 | Starkey et al. | 700/275 |
| RE35,336 E | 9/1996 | Ulch et al. | |
| 6,422,463 B1 | 7/2002 | Flink | |

(Continued)

OTHER PUBLICATIONS

"programmable logic controller", http://en.wikipedia.org/wiki/Programmable_logic_controller.*

*Primary Examiner*—Anthony Knight
*Assistant Examiner*—Sunray Chang
(74) *Attorney, Agent, or Firm*—Rob L. Phillips; Greenberg Traurig

(57) ABSTRACT

An embodiment of an access control system is disclosed herein that is easily customized by a user. A user defines cardholders, clearance levels, and logic scripts that dictate how the system will operate. User-entered changes propagate through the system automatically. The disclosed embodiment includes personality modules coupled to both field devices and a server. However, the personality modules operate autonomously from the server. Personality modules can also be added to the system dynamically and are auto-configuring. Display modules may also be included for locally and remotely programming, testing, managing, and operating personality modules and field devices. The system may include an intelligent display station that includes a reader and a display, displaying information in an interactive user interface in accordance with an individual's clearance level. Because the personality modules contain their own operating system, they can execute applications that allow direct interface to third-party systems.

13 Claims, 14 Drawing Sheets

U.S. PATENT DOCUMENTS 6,439,009 B1     8/2002  Heese et al.
6,504,479 B1     1/2003  Lemons et al.
6,641,533 B2 *  11/2003  Causey et al. .............. 600/300
6,806,847 B2 * 10/2004  Nixon et al. ................. 345/2.1

7,068,164 B1 *   6/2006  Duncan et al. ........ 340/539.16
7,136,711 B1 *  11/2006  Duncan et al. ................ 700/83
2003/0037170 A1 * 2/2003 Zeller et al. ................. 709/253

* cited by examiner

FACILITIES MANAGEMENT SYSTEM WITH PROGRAMMABLE LOGIC CONTROL

RELATED APPLICATIONS

This application claims the benefit of U.S. Provisional Application No. 60/428,555 filed Nov. 21, 2002, and is incorporated by reference herein. This application is related to the following applications: Facilities Management System, filed Aug. 29, 2003, application Ser. No. 10/651,841; Facilities Management System with Server-Independent Enclosures, filed Aug. 29, 2003, application Ser. No. 10/651,846; Facilities Management System with Direct Communication to Third-Party Systems, filed Aug. 29, 2003, application Ser. No. 10/651,844; Facilities Management System with Local Display and User Interface, filed Aug. 29, 2003, application Ser. No. 10/651,842; and Facilities Management System with Intelligent Display Station, filed Aug. 29, 2003, application Ser. No. 10/651,845.

BACKGROUND

Access control systems are frequently used to control unauthorized access to buildings or anything else to which access is limited, e.g., the operation of certain machinery such as baggage carousels. Such systems may include card readers, biometric readers, and sensors to sense, for example, when a door or window is opened or closed.

As shown in FIG. 1, most conventional systems 100 include a server 102, a database 103, and several units 104, 106, 108 for interacting with readers 110, inputs 112, or outputs 114. Inputs may include, for example, signals from sensors indicating status such as "door open" or "door closed." Outputs may include, for example, signals to relays, e.g., for opening a door.

In most conventional systems 100, the functions for controlling readers, inputs, and outputs are specifically and fixedly programmed and housed in physically separate units 104, 106, and 108. Each unit also independently connects to the server 102. Thus, at a particular location, e.g., a door, three physically separate box-like units are required: one to connect to a card reader, one to connect to inputs from the door (e.g., sensors to sense if the door is in an open or closed state), and one to connect to outputs for controlling the door operation (e.g., to release the lock). Obviously, this consumes considerable wall space or other real estate.

The functionality of readers, inputs, and outputs are fixedly programmed in firmware included in each unit 104, 106, 108 as shown in FIG. 1. The firmware is specific to the function the unit is to perform and the field devices expected to be coupled to the unit. Hence, for a particular brand of card reader, the reader unit will include firmware programmed to control that particular card reader brand. Moreover, while each unit may have multiple field devices (e.g., multiple readers) coupled to it, each port for those field devices is dedicated to and programmed to support that particular device. For instance, if a port on an output unit 108 is programmed to be coupled to a lock, only a lock can be coupled to that port.

Accordingly, if a change to the system needs to be made, either the entire unit 102, 104,106 must be replaced, or at a minimum, the EPROM storing the firmware usually needs to be removed and replaced with one with new programming. Frequently, this EPROM change may also require changes to the surrounding electronics and many parts of the system may also need to be reconfigured manually. Thus, upgrading such a system can be cumbersome. For large systems, such as those in airports, hospitals, or other large buildings, these upgrades can be quite costly and can temporarily compromise building security.

As a result of the fixed nature of these systems, these systems tend to be fully designed for the exact user need at installation. And while the ability to have a customized system may initially be desirable, the fixed nature of the system tends to make it burdensome to expand or change later.

Conventional-systems rely on server 102 as the "brains" of the system, housing almost all relevant software as well as the majority of system memory. The server 102 issues commands to control the operation of each unit 104, 106, 108. Only server 102 has access to the data in database 103. Little or no information about access privileges is stored in units 104, 106, 108. Thus, if communication with the central server is interrupted, many of these systems cannot perform any access control functions or perform such functions at a severely degraded level, frequently losing alarm condition information.

Conventional systems also tend to operate on slow networks based on RS-232 or 485 because they frequently must be compatible with old legacy systems. Because the units are designed for use with these slower networks, if use of a faster network, such as an ethernet network, is desired, an interface 116 must be used between the RS-232 or -485 signals and the ethernet signals. Still a system can only operate as fast as its slowest part (RS-232 or -485 speeds).

Further, most systems currently available are proprietary and not based on open architectures. They usually have proprietary networking architectures and communications protocols, databases and file formats, operating systems, graphical user interfaces, device drivers, or application program interfaces (APIs) for use with various field devices. Thus, the system will only operate with the manufacturer's own equipment and software or a limited subset of equipment and software available from selected suppliers. Accordingly, if the system is unreliable, does not meet end-user expectations, or if the user simply wants to use equipment from another supplier or share information from another database, the user will frequently be unable to. In other words, end users are at the mercy of system manufacturers.

Accordingly, a system that is more reliable, modular, faster, scalable, and easily upgradable is desirable.

SUMMARY

A system in accordance with an embodiment of the invention is a facilities management system, which may be an access control system, that is primarily software driven, making it a flexible system that can be easily customized by an end user. In particular, one embodiment of the invention includes a server, a client in communication with the server, a database in communication with the server and the client, and a personality module in communication with the server, the client, and a field device. In some embodiments, the personality module is modular and housed in an enclosure along with other modular personality modules. In addition to being modular, the personality modules come in a variety of types, including reader modules and I/O modules.

An access control system in accordance with some embodiments of the invention allows a user, through a client user interface, to define operation of the system. In particular, the user can define, and later edit, cardholders; clearance levels, and, alarms and events. In addition, the user can create customized logic scripts to be executed by the system and can define portals, which are collections of field devices and logic scripts. Any additions or changes made by the user are automatically propagated through the system and require no other user-intervention or rebooting of the system or components.

Further, in some embodiments, the personality modules are auto-configuring, such that when installed the personality module automatically receives an IP address and notifies the server. Further, in some embodiments, such installation is dynamic: personality modules, as well as enclosures, can be added or removed from the system while the system is operational.

Personality modules in some embodiments also contain all of the resources necessary to operate autonomously from a server. Such autonomy is particularly useful if the server fails or goes offline, enabling the system to continue to perform all facilities management functions without any performance degradation. In particular, in some embodiments, the personality modules include or are associated with a processor and memory. The memory is used to locally store all information required to perform access control functions, including cardholder information, clearance level information, logic scripts, and any applications necessary to carry out those functions.

An access control system in accordance with some embodiments of the invention-further include a display module local to respective personality modules. The display module displays a user interface which allows for local programming of personality modules, testing of personality modules and field devices, managing the personality modules and field devices, and operating or controlling of personality modules and field devices. In addition, in some embodiments, the interface displayed on display modules can also be used to program, test, manage, and operate or control personality modules and field devices at remote locations to the display module.

A system in accordance with some embodiments of the invention also includes an intelligent display station. The intelligent display station includes a reader and a display, and displays information in an interactive user interface to an individual in accordance with a clearance level associated with the individual.

Finally, because an embodiment of the system is primarily software based, the system can easily integrate with third party systems and components. In particular, personality modules in one embodiment of the invention include an operating system, enabling them to execute applications. Such applications are created to directly interface with third-party systems.

BRIEF DESCRIPTION OF THE DRAWINGS

The present invention is described with respect to particular exemplary embodiments thereof and reference is accordingly made to the drawings in which:

FIG. 15 is a block diagram of an intelligent display station in accordance with an embodiment of the invention, where an example screen shot is shown on the display 504 of the intelligent display station;

FIG. 16 is a function block diagram of the intelligent display station shown in FIG. 15;

FIG. 17 is a block diagram of a conventional system and a third-party system (Time and Attendance server); and FIG. 18 is a block diagram of a system in accordance with an embodiment of the invention coupled to a third-party system (Time and Attendance server).

DETAILED DESCRIPTION

Figure 1:
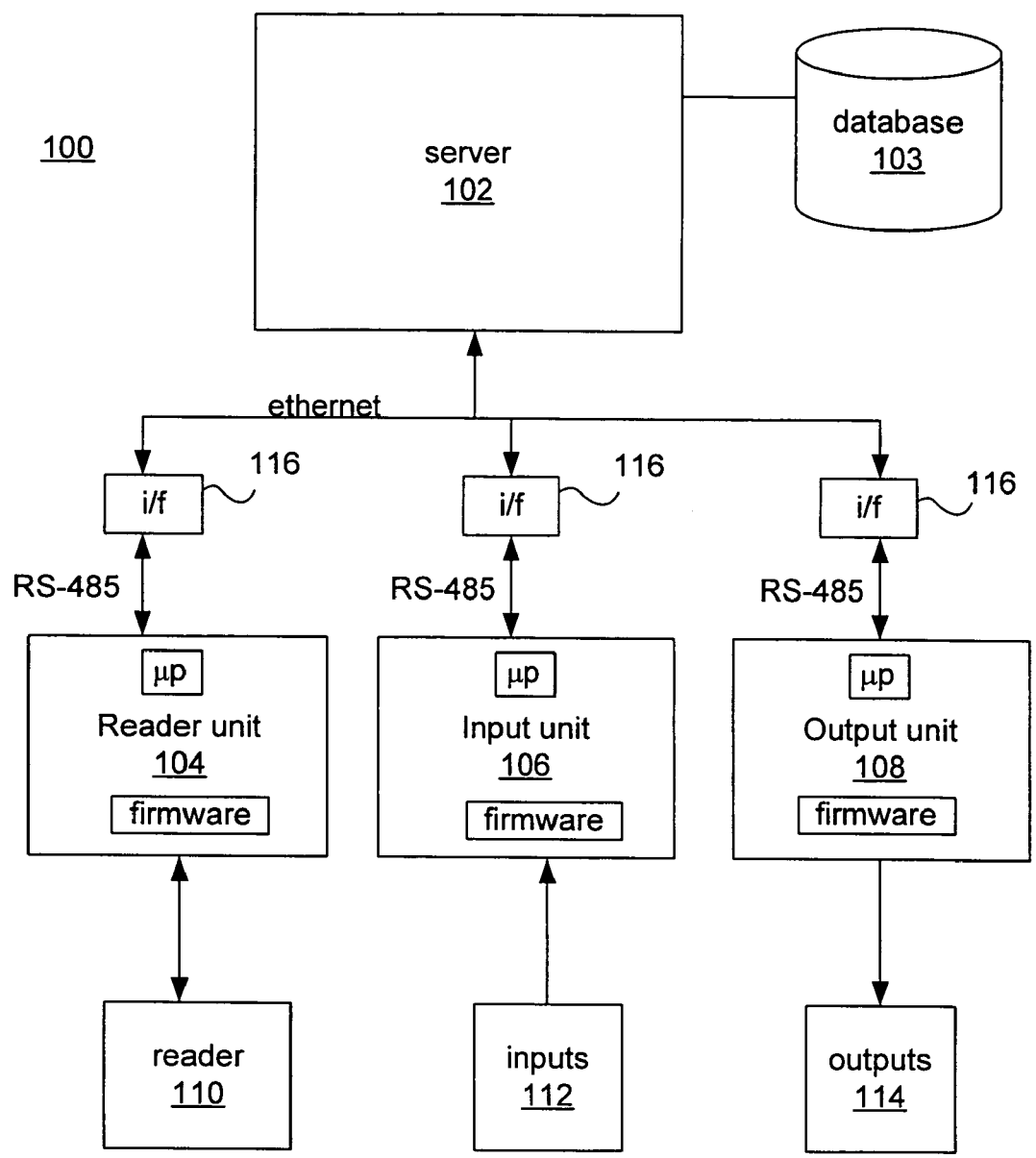
FIG. 1 is a functional block diagram of a conventional system.
Figure 2:
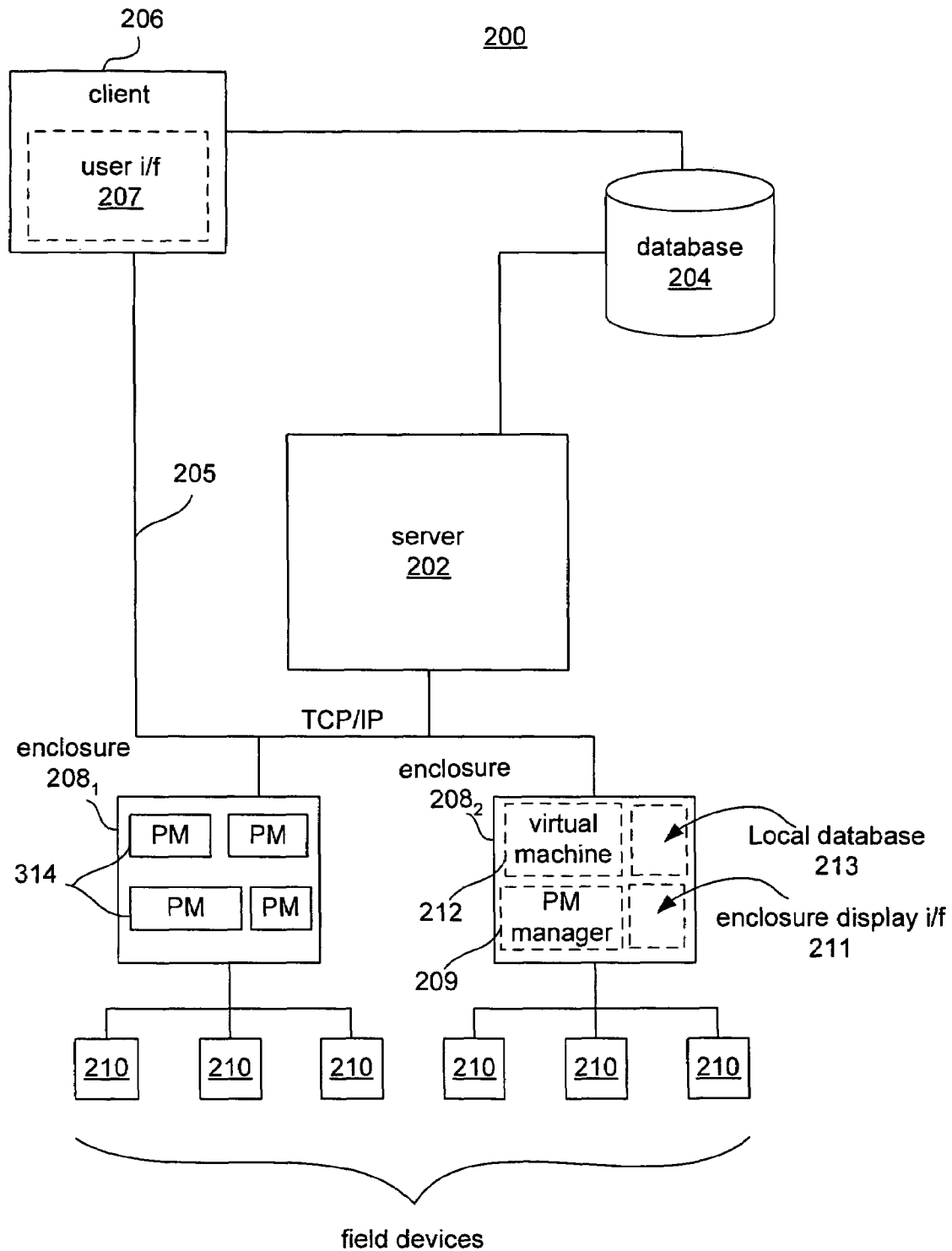
FIG. 2 is a functional block diagram of one embodiment of a system in accordance with the invention.

FIG. 2 illustrates an overview of a system 200 in a accordance with an embodiment of the invention. System 200 includes a server 202, database 204, a client 206, and one or more enclosures 208 which are each in communication with one or more respective field devices 210. Although server 202 and database 204 are shown separated, in some embodiments, server 202 and database 204 are located within the same physical structure. Two enclosures 208 are shown in FIG. 2, but other embodiments can include more or fewer. Server 202, client 206, and enclosures 208 are connected to one another via a TCP/IP connection such as Ethernet, although other embodiments may use other network protocols.

In one embodiment of the invention server 202 runs as a Microsoft Windows NT or Windows 2000 server designated as a Domain Controller with Active Directory installed. Server communicates with the database 204 using OLEDB technology as is known in the art.

Database 204 is any ODBC database, including, for example, Microsoft SQL Server or Oracle. Data stored on database 204 includes card and cardholder's data, transaction logs, facility maps, field device listings, logic scripts (including portals and groups information, discussed later), as well as various system settings.

In one embodiment client 206 is a personal computer that is running a Microsoft Windows operating system. In one embodiment, it further runs a Win32 user interface application 207 that includes an IIS server as is known in the art. User interface 207 is shown in dashed lines indicating that it is primarily implemented with software in one embodiment. Client user interface 207 includes an embedded HTML component allowing HTTP data to be entered and displayed in various user interface screens, which will be discussed later. Client user interface 207 is the primary interface for system users, displaying relevant information (e.g., alarm or event information) as well as allowing for user customization of the system and data entry (e.g., cardholder information), all discussed further later.

System 200, through the enclosures 208, is in communication with one or more field devices 210, such as card readers, inputs, or outputs. As used herein, inputs are from sensors that monitor points within the system. Typical inputs include signals from temperature sensors, light sensors, weight sensors, limit switches, or sensors for sensing status of doors or windows as open or closed, among others. Outputs are relays, actuators, or other control points in the system that can be commanded on or off to perform various tasks, such as unlocking doors, turning on lights, opening gates, controlling bag belts, or sounding an alarm. Although in some embodiments, field devices will be connected to system 200 with cables or other wiring, in other embodiments, such connections could be wireless.

Field devices 210 can be any industry-standard field devices produced by any vendor. Such field devices include virtually any passive field device (e.g., switches or motion detectors) as well as any active device that can be controlled by a software driver based on industry standards, such as Win32-type drivers As used herein, a device or software designed in accordance with "industry standards" or "open architecture" means that the device or software is designed in accordance with known industry standards or includes an interface based on known industry standards. Nonetheless, the "industry standards" may be based on proprietary devices or software. For instance, Microsoft produces proprietary operating system software but publishes information about how to interface with that operating system. Thus, as used herein, any software that could interface with the Windows operating system would be based on an open standard. Hence, use of "industry standards" or "open architecture" allows for ease of integration with other systems, devices, and software.

Enclosures 208 are installed throughout the premises to be secured. Enclosure 208 is essentially a housing that provides mounting space, and, in some embodiments, backplane connections for various modular devices. In one embodiment, the enclosure is comprised of either one or two racks, where each rack has six slots.

The modular devices housed in enclosure 208 are referred to herein as "personality modules." In one embodiment the personality modules 314 are mounted in a rack in the enclosure and plug into the backplane for power and signal communications. Being modular, the personality modules are designed with standardized dimensions, where the dimensions are measured according to a number of slots in a rack the personality module requires. For instance, in some embodiments, some personality modules require three slots, and therefore, two three-slot-sized personality modules would fit into each rack. Still other embodiments will have some personality modules that are of different sizes, e.g., two slots, four slots. In FIG. 2, four personality modules 314 are shown in one enclosure $208_1$. However, other embodiments will have more or fewer personality modules in an enclosure. Further, the number of personality modules in the enclosures on a particular premises may vary from enclosure to enclosure.

In addition to size variations, personality modules 314 come in a variety of types, where each type has a set of characteristics that define the personality module's functionality. For instance, in one embodiment, personality modules are reader modules (not to be confused with a card reader field device) or input/output (I/O) modules. As used herein, I/O modules refer to input modules, output modules, or combined input/output modules. Accordingly, the size and types of personality modules are chosen as necessary to customize each enclosure at a particular location to the specific requirements of the premises to be secured.

In one embodiment, particular personality modules that can potentially be placed in an enclosure include a 2-port reader module (PM2), an 8-port reader module (PM8), a 16-port input module (PM16), a 24-port output module (PM24), a 32-port input/output module (PM32), or a 64-port input/output module (PM64).

Both the PM2 and PM8 support two or eight industry standard readers, respectively, including card readers and biometric readers. The PM2 takes up one slot and the PM8 takes up three slots in a rack in one embodiment. More specifically, a PM2 provides circuitry to support two card readers, two Locking Device Outputs (LDO), two Warning Device Outputs (WDO), two Door Position Switch inputs (DPS), two Request to Exit inputs (RTX), two additional inputs (Aux IN), and two additional output circuits (Aux OUT). The PM2 also includes two onboard, fully addressable serial ports for interface to ancillary equipment such as fire alarm panels, alarm/intrusion panels, CCTV panels, and elevator controls. Similarly, a PM8 reader module provides circuitry to support eight card readers, eight Locking Device Outputs (LDO), eight Warning Device Outputs (WDO), eight Door Position Switch inputs (DPS), eight Request to Exit inputs (RTX), eight additional inputs (Aux IN), and eight additional output circuits (Aux OUT). The unit also provides eight onboard, fully addressable serial ports for interface to ancillary equipment such as fire alarm panels, alarm/intrusion panels, CCTV panels, and elevator controls.

PM16, PM24, PM32, and PM64 are input and/or output modules with no reader capability. A PM16 input module requires one slot in a rack in one embodiment and includes 16 inputs and circuitry for monitoring virtually any input device. A PM24 output module requires one slot in a rack in one embodiment and provides 24 outputs and circuitry for any output requirement. A PM32 input/output module requires two slots in a rack in one embodiment and includes 16 inputs and 16 outputs-along with circuitry for monitoring any input device and any output requirement. And a PM64 input/output module requires three slots in a rack in one embodiment and includes 32 outputs and 32 inputs along with circuitry for monitoring any input device and any output requirement.

All outputs in any of the above-described embodiments of personality modules are Form-C relay contacts, which in one embodiment are rated 3A at 24 VDC. All inputs into any of the above-described embodiments are analog, and are initially programmed for four-state processing, but can be converted to digital signaling with 4096 voltage zones available to accommodate virtually any application. In one embodiment, each input can also monitor "delta" changes of temperature or any other variable which results in rate change information (e.g., water flow). Accordingly, it can be seen that the personality modules can have a number of different characteristics while remaining modular, and the above-described personality modules should be understood to be exemplary only.

Figure 3:
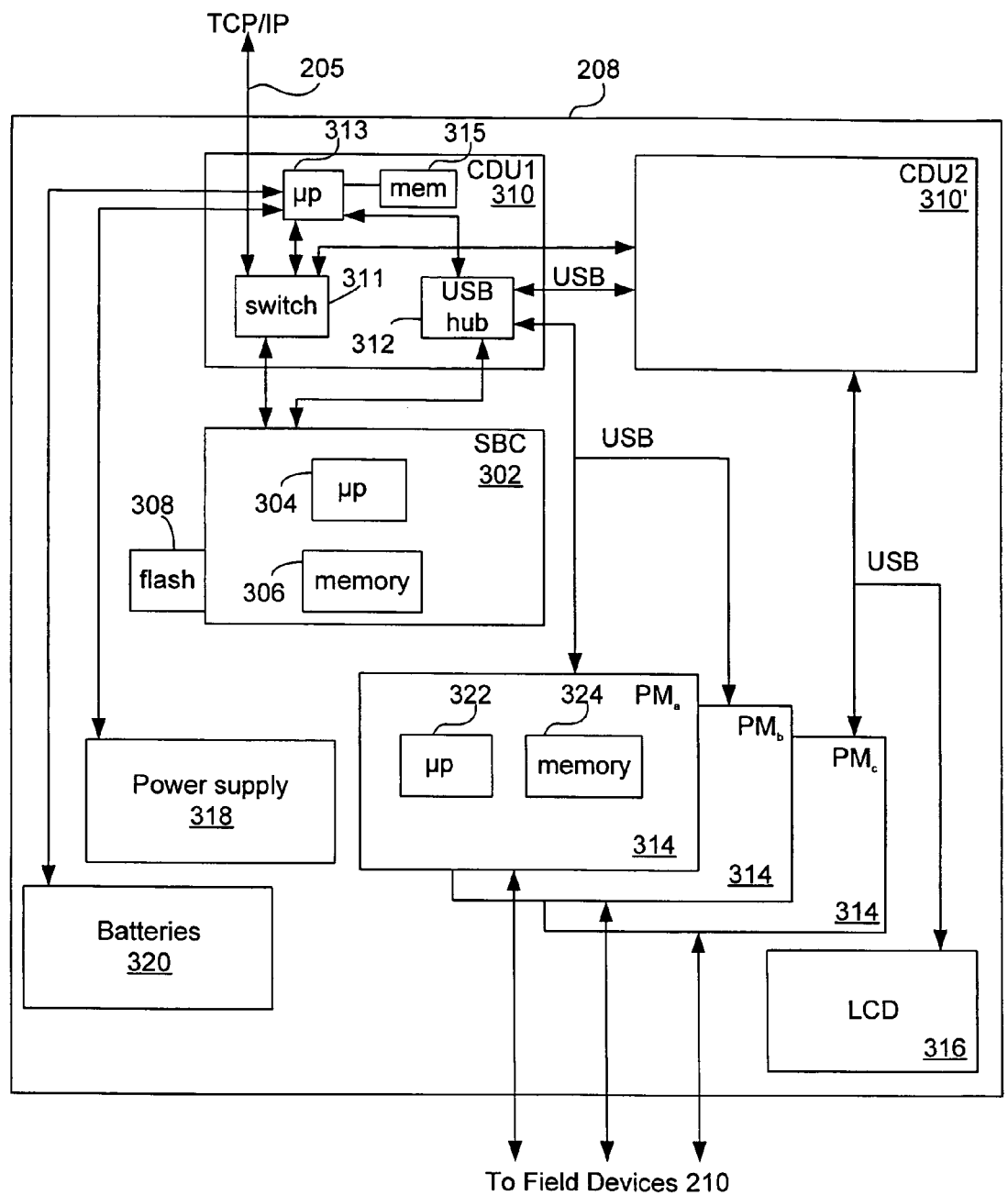
FIG. 3 is a functional block diagram of an enclosure in accordance with an embodiment of the invention.

FIG. 3 illustrates a functional block diagram of an enclosure 208 in accordance with an embodiment of the invention. As shown, in one embodiment, each enclosure 208 includes a single board computer (SBC) 302, one or more Chassis Distribution Units (CDUs) 310, one or more personality modules 314, a power supply 318, and batteries 320. Batteries 320 provide auxiliary power during unexpected primary power interruptions.

SBC 302 includes a processor 304, memory 306, and removable compact flash memory 308, in one embodiment.

Use of removable compact flash memory 308 allows for ease of upgrades in the system, including scalable memory. The SBC 302 communicates with the rest of system 200 through a CDU 310. In one embodiment the SBC utilizes Windows CE as its operating system, although other embodiments could use other operating systems.

Each enclosure 208 includes at least one CDU 310 in one embodiment. In an enclosure with two or more racks, each rack has its own CDU. FIG. 3 shows two CDUs, indicating a two-rack enclosure. In one embodiment, the CDU includes an 8-bit processor 313 and memory 315 for storing programming for the CDU functionality. The CDU processor manages the TCP/IP communications for the enclosure at switch 311. CDU 310 also manages the power supply 318 and monitors the battery 320 charge and temperature using an intelligent charging capability: as the temperature of the battery goes up, current for charging goes down. The CDU processor 313 further manages the USB interface and hub 312, used for communication between SBC 302 and personality modules 314.

As described previously, enclosure 208 includes one or more personality modules 314 of various modular sizes. Personality modules include a processor 322 and memory 324. However, in one embodiment both the processor and memory are small, for example, an 8-bit processor and only enough memory to house routines for initialization, USB startup, and an IP address (as commanded by the SBC and discussed later). In such embodiments, the SBC 302 houses the software, PM manager 209 (FIG. 2), for managing the personality modules 314 and a local database 213 (FIG. 2), stored in memory 306, 308, for storing data relevant for performing access control functions through the personality module. SBC 302 communicates to personality modules 314 through USB hub 312 in CDU 310, although other embodiments could communicate to the personality modules using another protocol. Note in FIG. 2 that enclosures 208, and 2082 are similar and that solely for illustrative purposes, 208, is shown with personality modules, and 2082 is shown with software components 209, 211, 212, and 213, all of which are stored on the SBC 302 in one embodiment.

In some embodiments, SBC 302 (FIG. 3) is attached to or integrally formed with one of the personality modules 314. In such embodiments, connectivity as shown in FIG. 3 does not change and the personality module to which the SBC is attached is referred to as the "master." Further, other personality modules 314 in such embodiments would not include the SBC, i.e., only one SBC is required per enclosure, and those personality modules are "slaves." In other embodiments, instead of relying on processor 304 and memory 306, 308 of SBC 302, a processor and memory may be included within each personality module having sufficient size and processing power to perform the memory and processing functions of processor 304 and memory 306, 308. Thus as used herein, the term "personality module" refers to a unit with one or more ports for communicating with one or more field devices and with included and/or associated processing power and memory (such as the processor 304 and memory (306, 308) on SBC 302).

Although the primary interface to the system 200 is through client 206, in some embodiments, enclosures can also be interfaced locally through a display module 316 at the enclosure itself. Display module 316 is similar to personality modules 314 in that it is modularly sized and that in some embodiments, it is managed by an application (enclosure display interface 211) stored on SBC 302. Display module 316, however, does not necessarily include ports for communicating with field devices.

In some embodiments, a display module 316 includes an LCD touchscreen. Other embodiments, however, may use other methods of at-enclosure interfacing. For instance, a port may be provided to plug into a laptop. Or, the screen provided may not be a touchscreen and a keyboard port is provided for entry. Many other alternatives are available, including wireless IR ports. Moreover not all embodiments will include a display module in all enclosures, and some embodiments may not include any display modules.

Display module 316 or other local interface allows for local setup and configuration, as well as troubleshooting. A display module 316 is also used to provide status and operational conditions for the Enclosure. For instance, in some embodiments, voltage, current, and operating temperatures are provided to the user via the display module. Battery conditions and self-check diagnostics may also be provided. Use of the display module 316 also allows local control of all field devices connected to the enclosure, e.g., unlocking doors, programming readers.

To perform these functions, display module 316 utilizes an additional software component, Enclosure Display Interface 211 (FIG. 2), also stored on SBC 302. Enclosure Display Interface 211 is a Windows CE-based software component, in one embodiment, serving as a user interface tool to the PM Manager 209.

Figure 5:
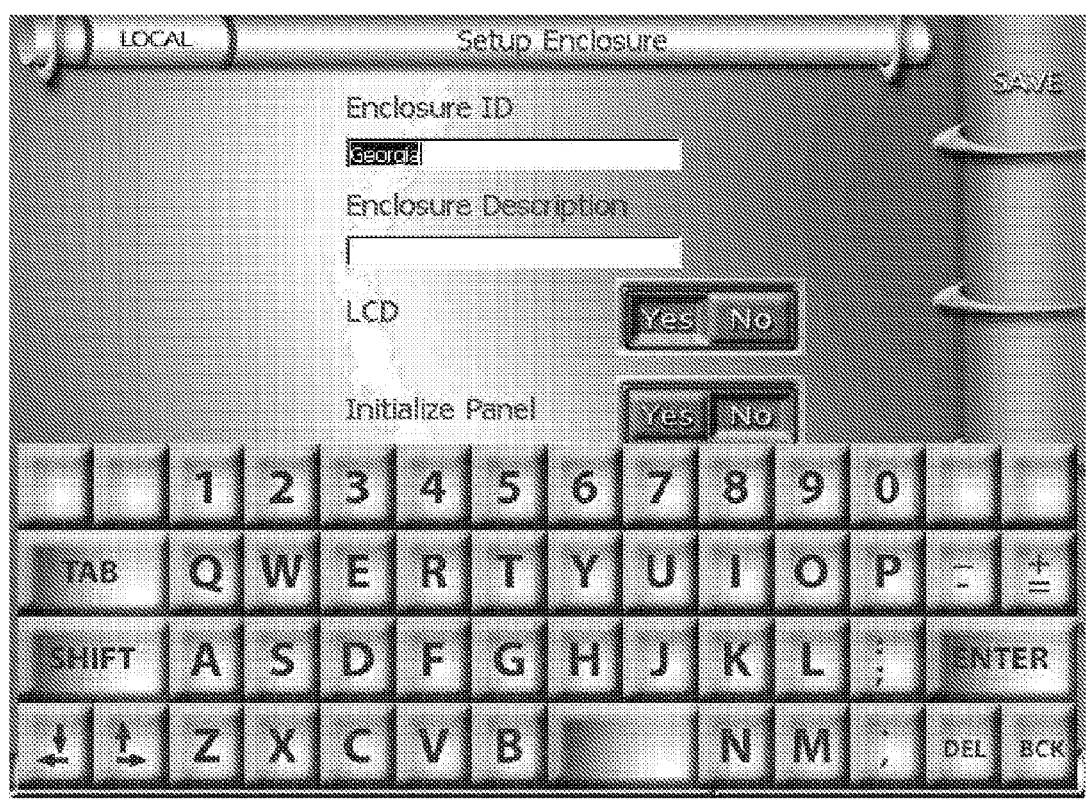
FIG. 5 is an example screen shot displayed on a display module in one embodiment in accordance with the invention.

Although primarily used in one embodiment to manage the devices in the enclosure in which it is installed, in some embodiments the Enclosure Display Interface component can remotely connect to any PM Manager 209 in the system and manage it, knowing only its IP address. Accordingly, the IP addresses of all personality modules that can be managed through the Enclosure Display Interface 211 are stored in local memory on the SBC 302. An example of a screen displayed on display module 316 is shown in FIG. 5.

Each personality module can be installed dynamically (while the system is running) and can automatically obtain an IP address on the network. When a personality module 314 is initially placed in an enclosure, a PM SENSE line coupled to the CDU 310 is activated, indicating the presence of the personality module. The CDU turns on power to the slots occupied by the personality module. The personality module then initializes and discovers it has no IP address. The personality module sends an initialization string to the SBC 302 via USB hub 312. When the SBC 302 receives the string it will activate an address and return the address and USB driver to the personality module. Once this initialization process is complete, SBC 302 manages the data to and from the personality module based on its address. The SBC 302 also notifies the server 202 of the addresses and of the available ports (e.g., how many reader or I/O ports) at that address, and the server in turn stores the IP address and port information for the personality module in database 204. Hence, the system is auto-configuring while conventional systems generally require the manual setting of dip switches to set addresses. Moreover, each personality module is independently addressable.

Figure 4:
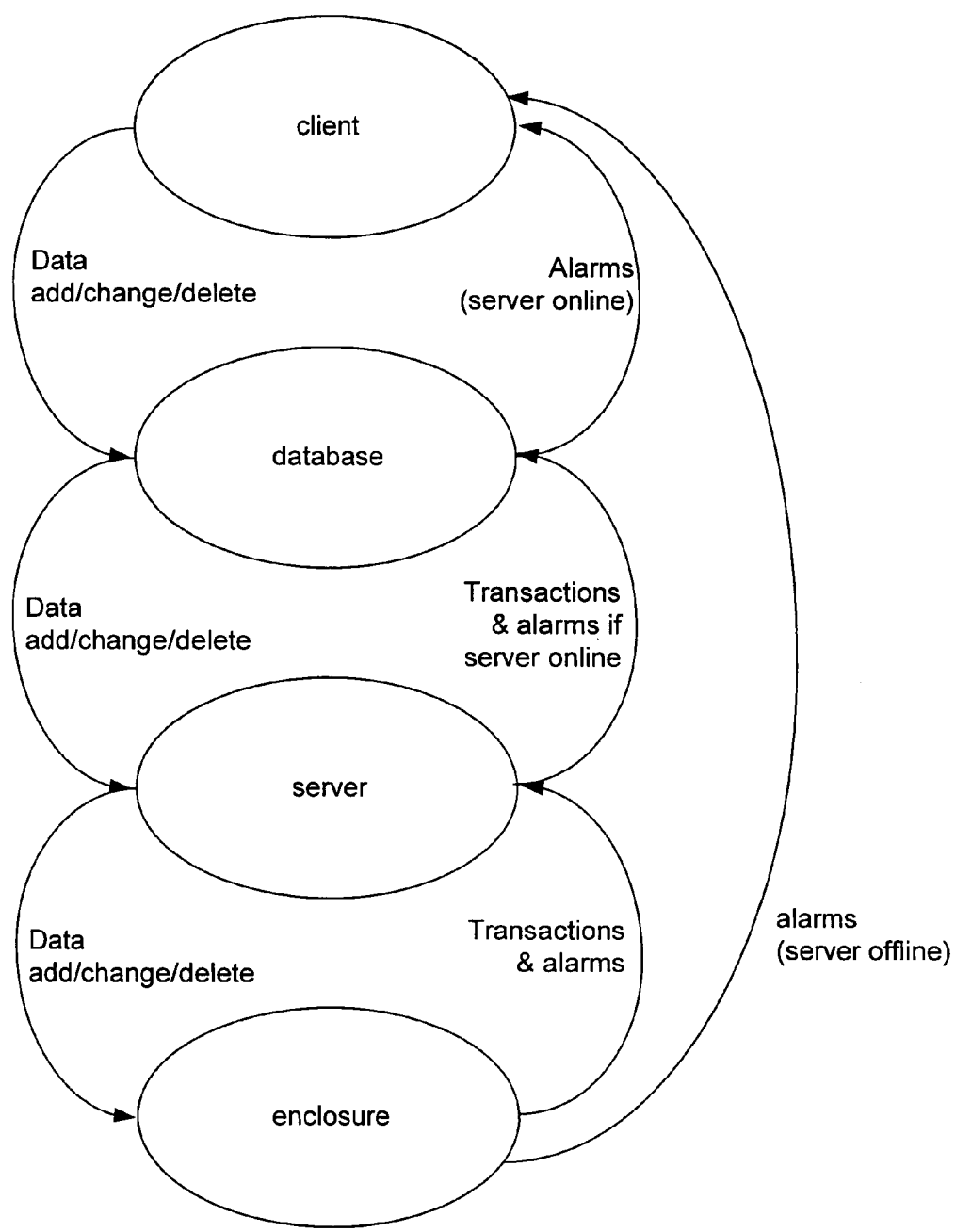
FIG. 4 is a diagram illustrating data flow in a system in accordance with an embodiment of the invention.

Referring to FIG. 4, when information, e.g., cardholder information or clearance level information, is entered at client 206, it is stored on database 204 and sent to server 202. Server 202 parses the information and sends all information relevant to each respective personality module to the appropriate enclosure. As a result, PM Manager 209 receives downloads from server 202 and locally stores all relevant information in local database 213 for interacting with the field devices bound to the particular personality module. Such information may include card holder information, clearance level information, and logic scripts. For instance, if the personality module controls the "west lobby door" the server will provide to the enclosure all of the information relating to cardholders, clearance levels, control functions, or anything else required to properly grant access through the west lobby door. PM Manager 209 periodically receives updates of this information from server 202. When information is received from a field device (such as a grant access request), PM Manager 209 interrogates the locally stored information, makes access decisions, and issues commands to the field devices (e.g., lock, unlock) based on the local data. Because all of the information for performing access control functions is available in its own local memory, each PM Manager 209 is autonomous and can operate without the presence of server 202.

PM Manager 209 also locally stores information about the field devices connected to the respective modules and passes that information to server 202. Finally, PM Manager 209 provides diagnostic information to the client user interface 207, server 202, or Enclosure Display Interface 211 regarding the Enclosure and field devices coupled to the Enclosure.

Referring again to FIG. 4, in normal operation, the PM Manager 209 will send transaction, event, and alarm information to server 202 as they occur. Server 202 stores the received information in database 204. Alarm and event information is displayed on client 206 (described further later).

As shown in FIG. 2, in addition to being in communication with a server 202, each enclosure 208 is in communication with client 206, over the TCP/IP network 205. Thus, in the event that server 202 fails or goes offline, the enclosure, through PM Manager 209, will store all events, provide or deny access as determined by the information stored locally at the enclosure 208, and provide alternate alarm routing by sending events, alarms, and diagnostic information directly to client 206 (see FIG. 4). The PM Manager can also receive commands from the client 206. Thus, in addition to each personality module being autonomous, such alternate routing enables all event, alarm, and diagnostic functions to continue to operate without a server present. Thus, when server 202 is offline, access control functions can continue without any significant degradation to system performance.

In some embodiments, a second server (not shown) is provided as a standby server. In the event of a primary server failure, the enclosure will automatically switch to the standby server, without user intervention, based on information stored in local memory, e.g., memory 306 or flash memory 308. In the event of a dual server failure, the Enclosure will behave as in a single server system with a server failure: store all events, provide or deny access as determined by the locally stored information, and still send alarms to any client on the network designated to receive those alarms.

Client user interface 207 monitors system activity and diagnostic information and also provides for administrative control of the system such as configuring and editing system settings, entering and editing users and their permissions within the system. For instance, client user interface 207 allows maintenance of the cardholders and users information in database 204, serves as a badging station, can provide access to alarm and facility maps to a user, allows creation of and editing of clearance level information, allows editing of system configuration, allows the user to input commands and receive diagnostic information, allows access to and maintenance of field device information (stored in database 204), and allows a user to define groups and portals (described later). In addition, various reports can be generated using client user interface 207.

When a user adds or edits any of the information described above, most of which is stored in database 204, client user interface 207 sends the additions and changes to the information to the database 204 using an ODBC connection as will be understood in the art. The database then sends an update message to the server 202. After receiving this update message, the server prepares an update message for PM Manager 209 (if needed) or takes action depending on the update.

Figure 6:
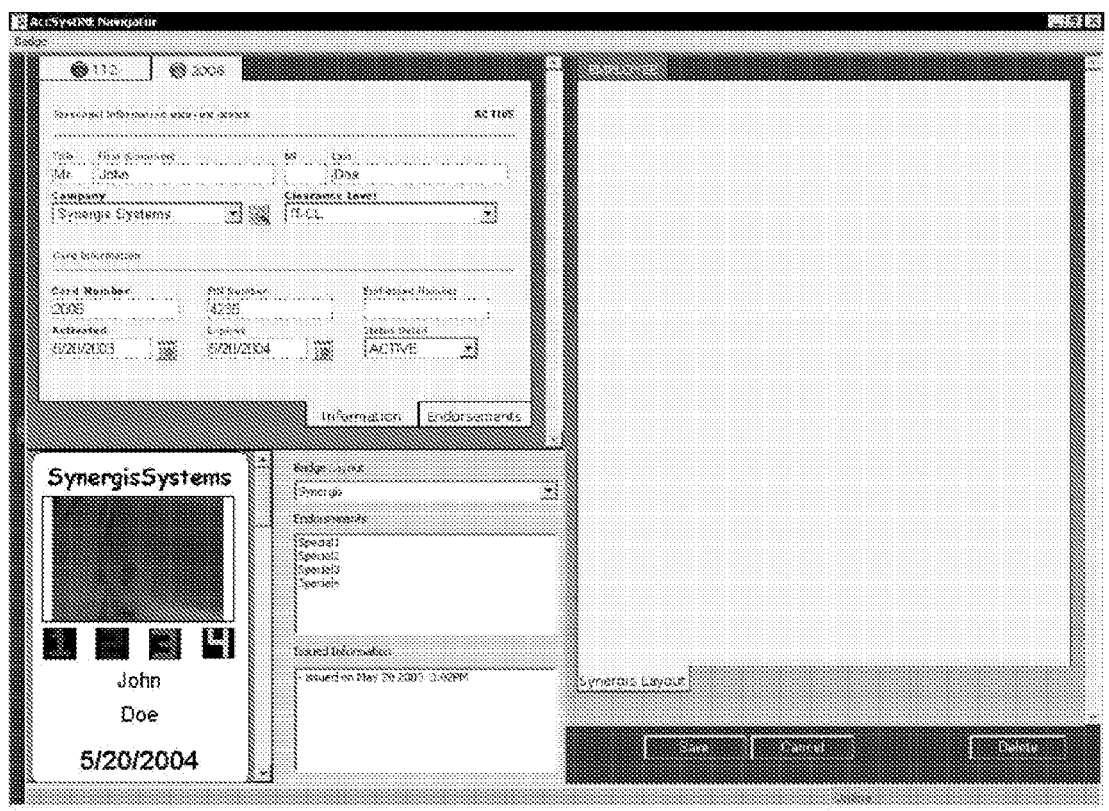
FIG. 6 is an example screen shot displayed by client user interface for entering and editing cardholder information in one embodiment in accordance with the invention.
Figure 7:
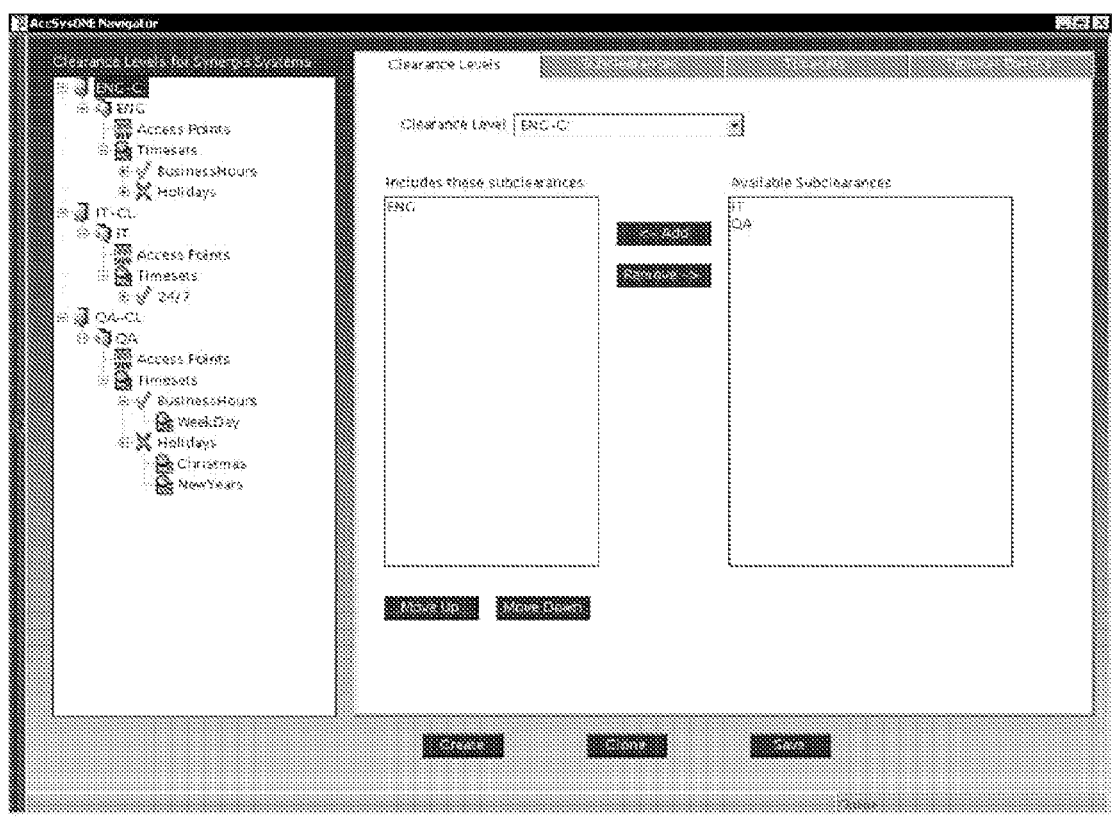
FIGS. 7-10 are example screen shots displayed by client user interface for defining and editing clearance levels in one embodiment in accordance with the invention.
Figure 8:
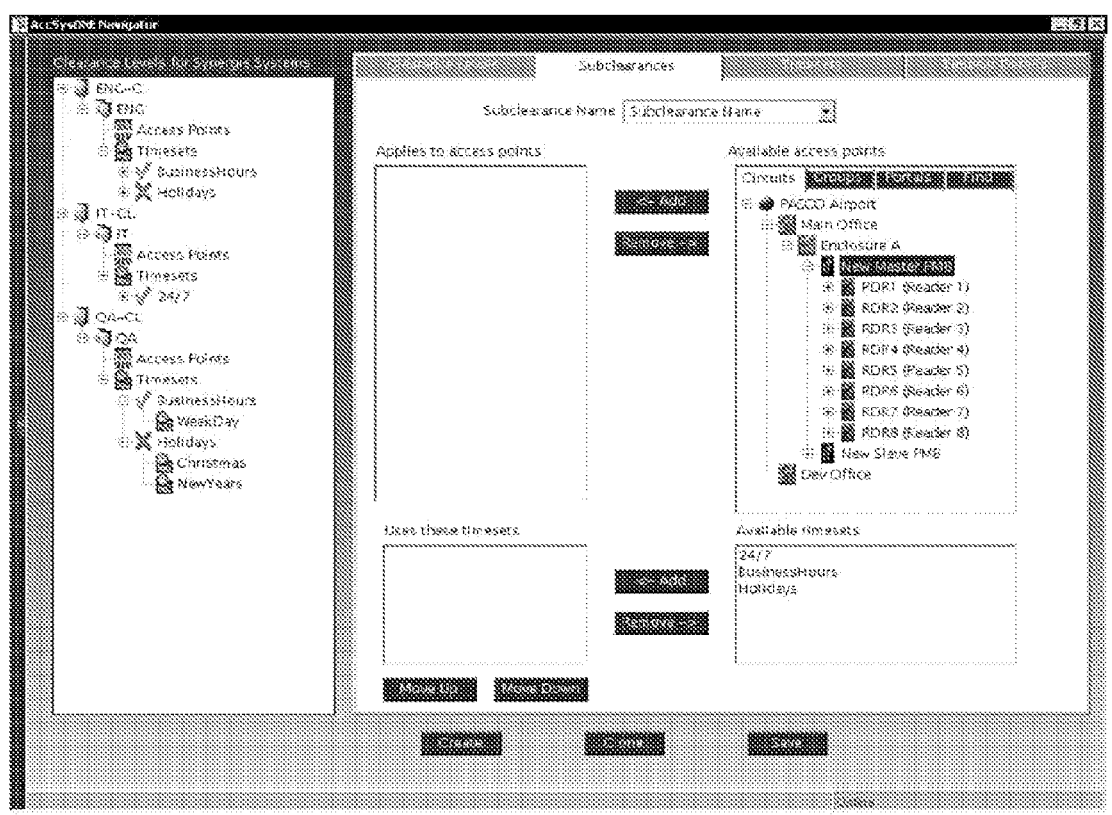
Figure 9:
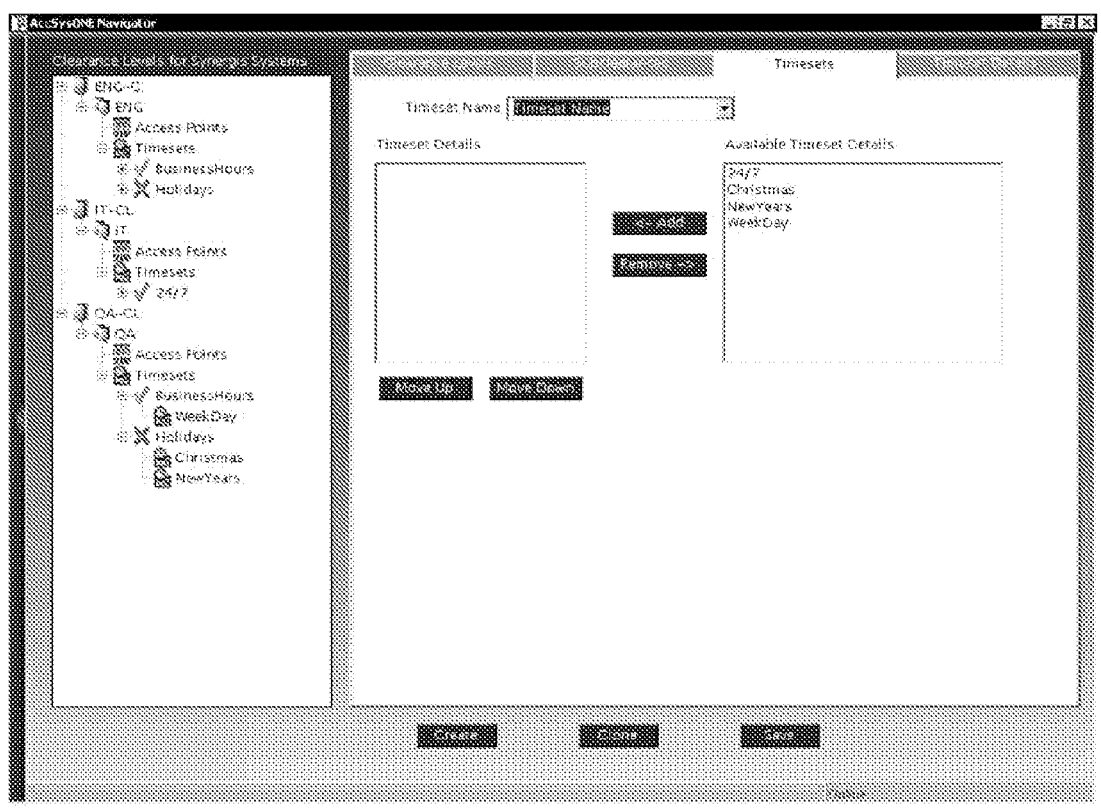
Figure 10:
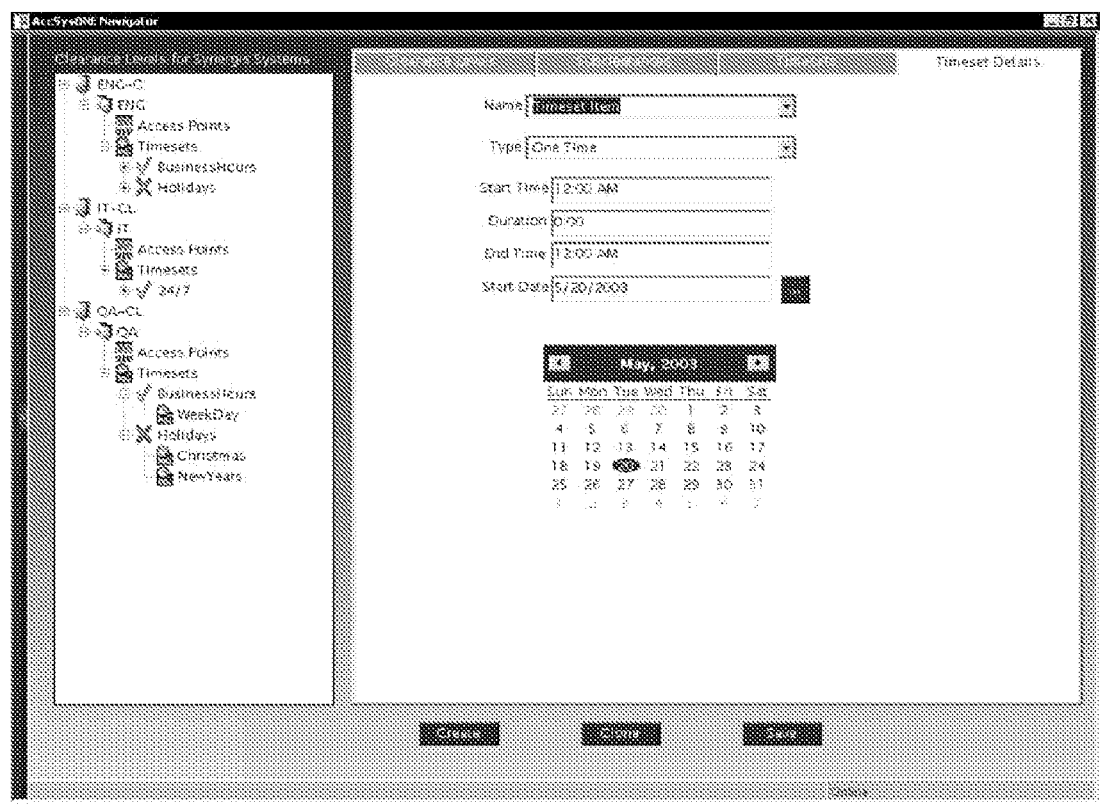

More specifically, client user interface 207 allows for maintenance of all information related to cards, cardholders, employers, etc. An example of a screen used to define a cardholder is shown in FIG. 6. Each company-user can create their own fields for their employees in addition to any predefined fields. Client user interface can retrieve information from the database 204, allow a user to modify it, and upload the modified information back to the database. This gives the user the ability to create their own fields and to customize the user interface for editing the data. The cardholder information is accessed using the IIS server from the client user interface 207.

Badge creation can also be performed through client user interface in one embodiment, and is similar to the cardholder information in that each company-user can design their own badges or cards, including defining card classes as well as the fields to be incorporated into the badge or card. All badge/card data is kept in the database 204.

In addition, database 204 maintains a listing of all of the devices, including their locations and other relevant information, installed on the premises, including readers, enclosures, modules, inputs, and outputs. Users can add, delete or edit the data from client user interface 207. Any database changes will generate an automatic update from the server to the PM Manager 209 responsible for the particular device.

Clearance level information for the system is also initially defined by a user at the client user interface 207. Examples of screens used to define clearance levels are shown in FIGS. 7-10. A clearance level defines a set of permissions for allowing or denying access to various controlled elements in the system. For instance a clearance level can determine not only who gets to open a door, for example, but also who gets to reconfigure a display or log a guard tour. The client provides the clearance level information to the server, which separates the clearance level data into individual data sets for each personality module. The server then downloads the respective data sets to the appropriate personality modules. The personality modules then locally maintain clearance level information. The server may then periodically query the PM Manager 209 for its Clearance Level Database. The PM Manager 209 synchronizes updates to the Clearance Level Database with access queries. When a card is scanned (or other identifying information is presented), the PM Manager 209 checks locally stored clearance levels to determine if access should be granted or denied.

Also through the client user interface 207, a user can define objects called "Portals" and "Groups." A Portal is a selected collection of field devices, inputs and outputs that in some instances also has a logic script associated with it. Logic Scripts are executed by virtual machine 212 on SBC 302. A Group is a collection of Portals and field devices. A Group may also contain other Groups. A Group may or may not have one or more logic scripts associated with it. By using Portals and Groups a system in accordance with an embodiment of the invention gives the user flexible tools for creating custom logic to deal with a variety of situations based on information received from field devices and I/O.

Figure 11:
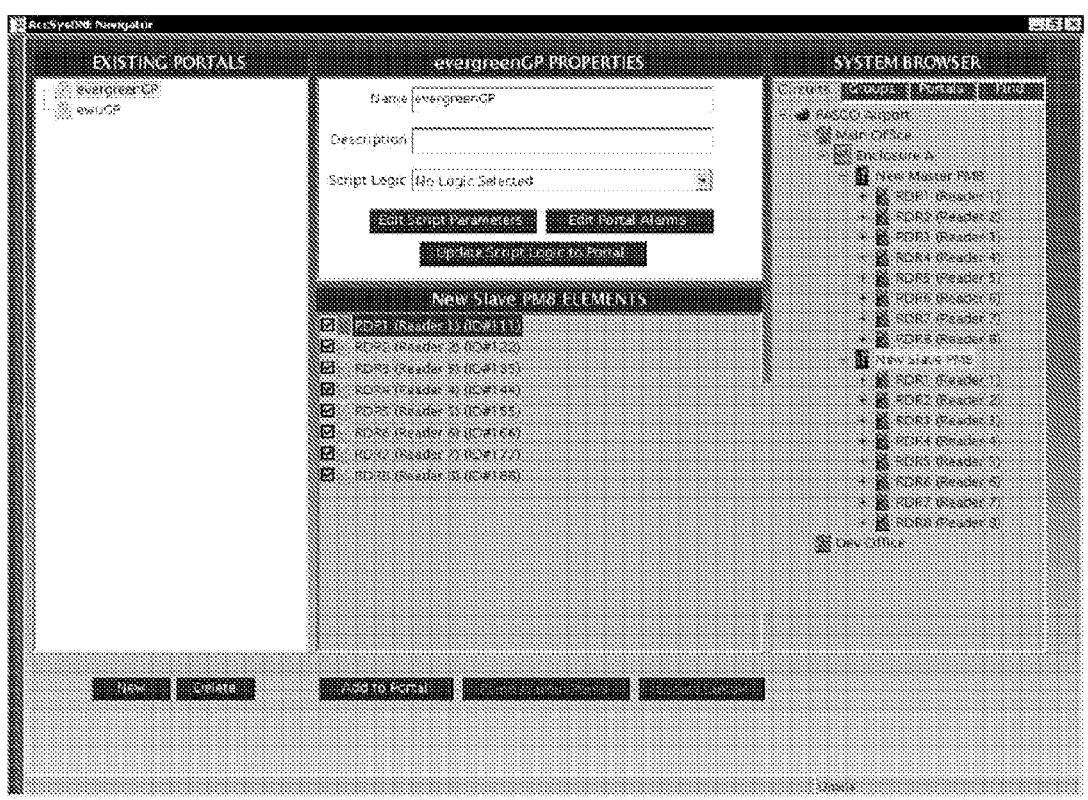
FIG. 11 is an example screen shot displayed by client user interface for defining and editing portals in one embodiment in accordance with the invention.

An example of a screen for defining a portal is shown in FIG. 11 where eight readers (all coupled to a newly added personality module) are being added to the portal "evergreenGP."

For instance, a Portal called "Fire door" may be defined to include: a first reader on a first side of a door, a second reader on a second side of a door, a lock, and a door position switch (DPS). Clearance levels for access can simply be granted for "Fire Door". In contrast, in conventional systems, control must be set up for and access independently granted for "fire door in" and "fire door out" because completely separate installations, programming, and control must be set up on each side of the door, e.g., for a first reader, first lock, and first DPS on one side of the door and a second reader, second lock, and second DPS on the second side of the door (although the first and second lock are typically hardwired together and first and second DPS are typically hardwired together). Thus, use of Portals not only eliminates hardware and wiring (e.g., the second lock and second DPS), but because portals are created through software, the user has considerable flexibility and power to make an access control system operate in accordance with the user's own criteria.

As described above, Portals not only include a collection of field devices and I/O, but may also be associated with a user-defined logic script in one embodiment of the invention. The logic script generally provides functionality for a Portal, e.g., what actions are to be taken if certain events occur. For instance, a Portal can be defined so that when a disabled person swipes his or her card to get access through a door, the door will remain open longer. In conventional systems, to handle this situation, additional readers had to be added merely to add additional time for the door to remain open.

Although doors have been described, Portals can be easily applied to control the access to limitless items: e.g., elevators, baggage carousels, room temperature.

Portals, including their logic scripts, are run on virtual machine 212, which incorporates a programmable logic controller (PLC) based on standard IEC61131 control languages, giving the user flexible tools for dealing with a variety of situations based on information received from field devices and I/O. In one embodiment, a toolkit to implement the PLC virtual machine 212 is provided by ICS Triplex IsaGRAF (formerly Altersysu Corp.), headquartered in Longueuil, Quebec, Canada.

Virtual machine 212 is run by the SBC. It communicates with the field devices through the PM Manager 209 while running user-defined script for controlling one or many field devices/inputs/outputs that defines a portal. The logic scripts associated with each personality module are stored locally at the enclosure. The user interface for defining Portals and Groups is on client user interface 207. When a user defines a new portal or changes the parameters for an existing one, all of the updates are provided to database 204 and are propagated by the server to the appropriate PM Manager 209. Upon receiving new data, PM Manager 209 communicates to the virtual machine 212, changing the needed behavior dynamically without rebooting. Hence, Portals (and Groups) can easily be developed and changed by the user to control access to virtually anything controlled by the system.

A simple example of Portals and clearance levels would be a facility with two groups. One controls access to a manufacturing building, the other controls access to a cafeteria building. Each building has multiple doors, but all the doors in a particular building are controlled by the same rules, so a single Portal for each building controls all the doors for that building (e.g., two Portals are defined, "Manufacturing Door" or "Cafeteria Door", where each Portal is defined to contain all of the mechanisms required to control the doors such as locks, DPSs). Manufacturing employees are to be allowed access to the manufacturing building from 6 am to 6 pm on weekdays, and access to the cafeteria building from 11 am to 1 pm on weekdays. Cafeteria employees can access the cafeteria from 6 am until 4 pm on weekdays, but are never to be allowed into the manufacturing building. There are several possible ways to set up the clearance levels to implement these policies. Below is one set of clearance levels that meet these requirements:

1. allow access through any Manufacturing Door from 6 am to 6 pm on weekdays;
2. allow access through any Cafeteria Door from 11 am to 1 pm on weekdays;
3. allow access through any Cafeteria Door from 6 am to 4 pm on weekdays;
4. by default, if access is not explicitly allowed, it is disallowed.

Two sets of Persons are then defined: Manufacturing Workers and Cafeteria Workers. The first set is associated with clearance levels 1 and 2 above, and the second set is associated with clearance level 3 defined above.

In addition to the considerable, flexible administrative control, client user interface 207 also provides an Alarm Monitoring and Control (AMC) interface. In its AMC function, client user interface receives alarm and event data in real time from either server 202 or PM Manager 209 (if the server is offline) and communicates that information to the database 204. Alarms are high priority issues that require acknowledgment and operator intervention. Events are low priority traffic issues that may or may not require acknowledgment. Alarms and Events can be generated in a number of ways, e.g., by logic scripts, by PM Manager 209, by server, or by client user interface 207 itself. For example, adding a new user to the system from client user interface 207 results in an "event." This event must be logged into the database and sent to other client devices (e.g., another client user interface 207) to which the information is relevant.

When an alarm or event is generated at an Enclosure, PM Manager 209 sends the alarm or event information to the server and holds the information until it receives a confirmation from the server that the information was processed (e.g., logged into database 204 or sent to client user interface 406, a printer, a pager, or another client device). When PM Manager 209 cannot connect to server (offline mode), e.g., because it has not received an acknowledgment after a designated time period has passed, PM Manager 209 stores all transactions internally, using compact flash card 308. When the server is back online, the PM Manager 209 uploads all transaction logs, thus allowing the server to put them into the database.

Figure 12:
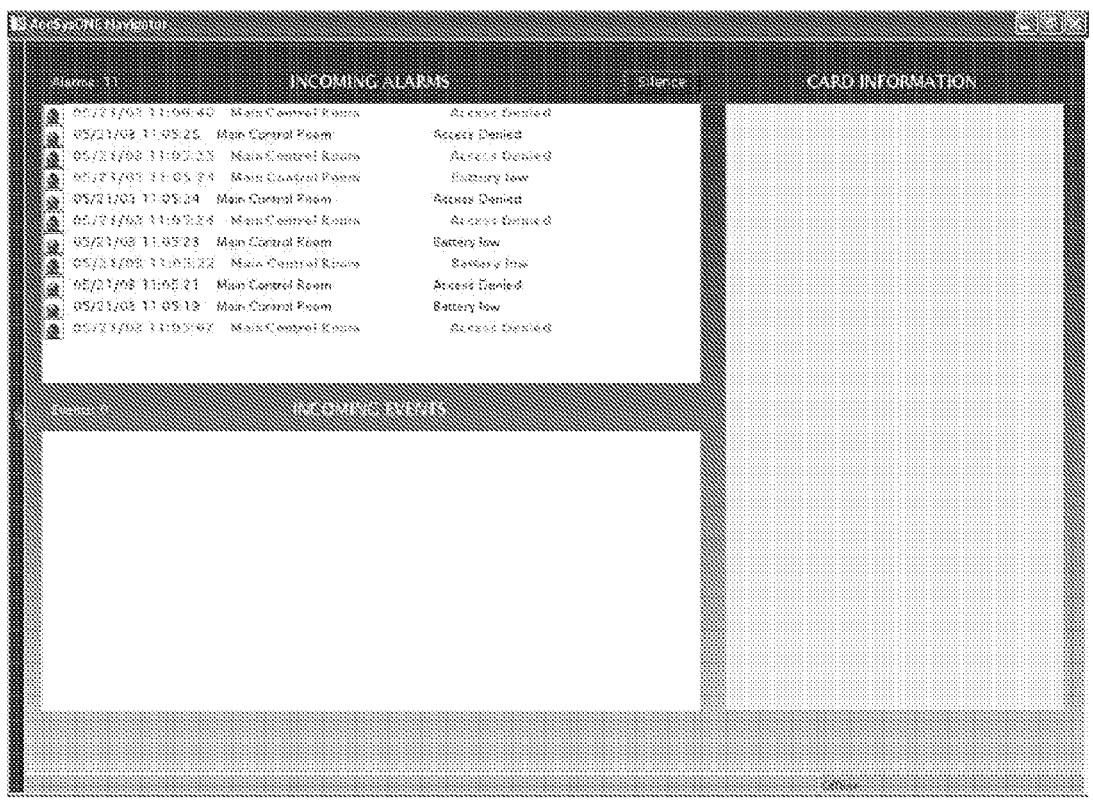
FIG. 12 is an example screen shot displayed by client user interface for monitoring alarms and events in one embodiment in accordance with the invention.

At client user interface 207, incoming alarm and event traffic is split into two display queues: incoming alarms and incoming events. An example of a screen displaying the queues is shown in FIG. 12. Incoming alarms are high priority issues that require acknowledgment and operator intervention. Incoming events are low priority traffic issues that may or may not require acknowledgment. The queues are displayed on a graphical user interface in some embodiments.

Figure 13:
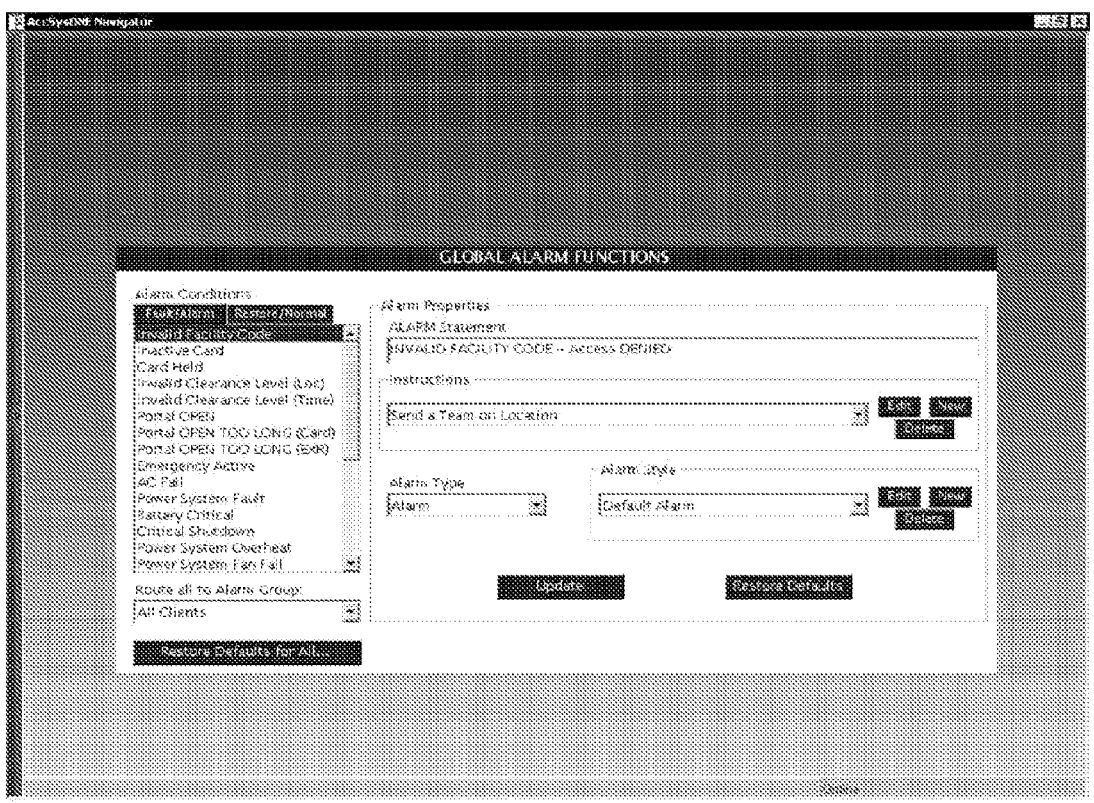
FIGS. 13-14 are example screen shots displayed by client user interface for defining and editing alarms and events in one embodiment in accordance with the invention.
Figure 14:
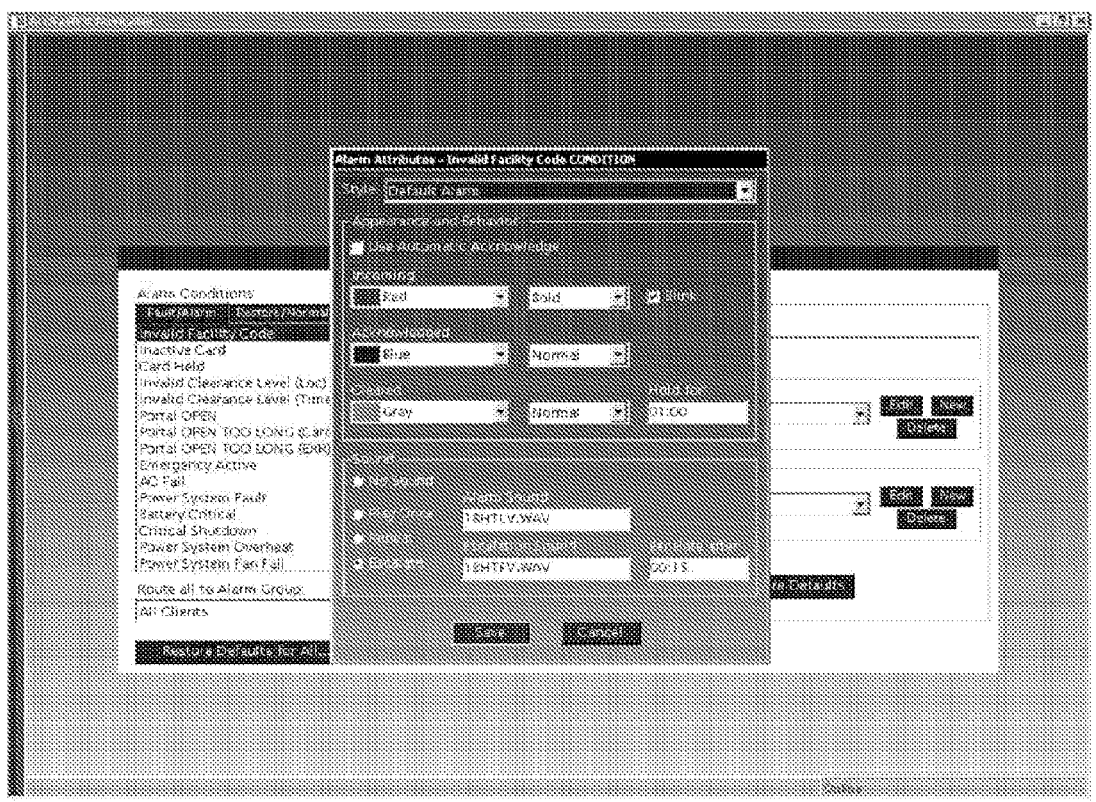

In some embodiments, each alarm and event has four stages once queued: 1) new alarm (just arrived), 2) acknowledged alarm, 3) cleared alarm, and 4) removed from the queue after predefined time period once cleared. Each stage has its own display characteristics. For instance, in one embodiment new incoming alarms are blinking red, while cleared alarms and events are grayed out. When an alarm or event is received, the entry will display at the top or front of the queue on the user interface and in some embodiments the word "Alarm" or "Event" will blink in a queue header. To switch the alarm status (stage), e.g., to acknowledge the alarm, the user selects an appropriate command from the graphical user interface, although in some embodiments some alarms and events will be automatically cleared after a predesignated time period. Alarms are also associated with sounds in some embodiments. Although the colors red and grey have been described, different colors can also be used to differentiate alarms in various embodiments. In some embodiments, client user interface also supports the import of DXF graphic files or other graphic file formats, allowing users to view the location of the alarms on a real map of the premises. Examples of screens used to define events and alarms are shown in FIGS. 13 and 14.

In one embodiment, events include those described in Table 1 below.

TABLE 1

| | |
|---|---|
| SystemOnline | indicates the personality module is online. Contains the timestamp of when the system came online. |
| SystemShutdown | indicates the personality module is shutting down. Contains the timestamp of when the system begins shutting down. |
| InitializationMode | indicates the personality module has entered initialization mode. Contains the timestamp of when the system entered initialization mode. |
| NormalMode | indicates the personality module has entered Normal mode. Contains the timestamp of when the system entered normal mode. |
| ScriptStarted | indicates when a logic script started. Contains the timestamp of when the script started. |
| ScriptStopped | indicates when a logic script stopped. Contains the timestamp of when the script stopped. |
| CardScanned | indicates a card was scanned. Contains the timestamp of when the card was scanned, the card number, and reader number. |
| AccessGranted | indicates access was granted. Contains the timestamp of when the access was granted. |
| AccessDenied | indicates access was denied. Access can be denied because of clearance level or time of day. Contains the timestamp of when the access was denied. |
| DoorOpened | indicates a door position sensor is indicating a door has opened. Contains the timestamp, reader number, and door number of the door that opened. |
| DoorClosed | indicates a door position sensor is indicating a door has closed. Contains the timestamp, reader number, and door number of the door that closed. |
| RequestToExit | indicates a request to exit sensor input was triggered. Contains the timestamp of when the sensor was triggered. |

In one embodiment alarms include those described in Table 2 below.

TABLE 2

| Signal | Indicates |
|---|---|
| DPSShortCircuit | A door position sensor is in a shorted condition, resulting from a door closing or closing after being held open. Contains the timestamp, reader number, and door number of the door whose position sensor is indicating a short circuit. |
| DPSOpenCircuit | A door position sensor is in an open circuit condition, resulting from a "door open" detected or when a door is held open. Contains the timestamp, reader number, and door number of the door whose position sensor is indicating an open circuit. |
| Overcurrent | A Personality Module has detected an overcurrent condition. Contains the timestamp and reader number of the reader indicating an overcurrent condition. |
| RelayStuck | A Personality Module has detected a relay stuck condition. Contains the timestamp and reader number of the reader indicating a RelayStuck condition. |
| TamperSwitch | A Personality Module has detected a tamper switch is triggered. Contains the timestamp and reader number of the reader indicating a tamper condition. |

Some embodiments of a system in accordance with the invention include a specialized field device 210 herein termed "intelligent display station." Referring to FIG. 15, an intelligent display station 500 includes, in one embodiment, a proximity card reader 502, shown in phantom since it is encased within the station 500, and a touchscreen display 504. Although a proximity card reader is shown, other embodiments could use other types of readers, including smart card readers, swipe readers, biometric readers, and digital video readers. As well, displays other than a touchscreen can be used (e.g., a display with a keyboard or keypad). As shown in FIG. 15, various touch-sensitive areas ("buttons") and graphics are displayed on display 504 for control of luggage bag belts.

As shown in FIG. 16, the intelligent display station 500 includes an SBC 506, a touchscreen 504 with touchscreen controller 508, and a card reader 502. The SBC 506 includes, in one embodiment, the Windows NT operating system. The intelligent display station 500 is in communication with a reader-type personality module 314 in an enclosure.

The intelligent display station 500 displays information to a user, in one embodiment, using Internet Explorer in "kiosk" mode. That is, web pages are displayed without Internet Explorer framing or borders. The PM Manager 209 managing the personality module to which the intelligent display station is connected then acts essentially as a web server. The web pages to be displayed are stored in local database 213, but are also cached at the intelligent display station 500, in one embodiment.

When an individual swipes his or her card at the intelligent display station, or otherwise presents credentials, a web page will be displayed that is consistent with that individual's clearance level. In other words, only information/buttons to which the cardholder has access are displayed. For instance, referring to FIG. 15, if a particular individual had clearance to control bag belt 1, but not bag belt 2, only the information relevant to bag belt 1 would be displayed. The PM Manager 209 strips out of the page all information for which clearance is not authorized. In one embodiment, each button on the display is deemed a "virtual input" with an associated graphic. In such an embodiment, if an individual is not cleared for particular virtual inputs, the attributes for the graphic associated with that virtual input are changed from "visible" to "invisible;" although other methods for removing the unauthorized information can be used.

In some embodiments, before displaying control information to a cardholder (or simply granting access through a door), the intelligent display station 500 may display a keypad or keyboard, requiring additional information such as a PIN or other code associated with the cardholder. An intelligent display station 500 in accordance with an embodiment of the invention has numerous other applications. For instance, it can be used to display a floor plan, indicating to an individual leaving the premises that a door remains open or unlocked. It can further be used for process control, that is, access to and control of various machines. It can further be used in a hospital setting allowing physicians secure access to their respective messages or patient information. As can be seen, an intelligent display station in accordance with an embodiment of the invention has numerous applications and those described above are intended to be exemplary only. In addition, an intelligent display station in accordance with an embodiment of the invention enables a user to replace several readers with a single unit offering control of multiple access points and devices, e.g., doors, PC access, building controls, elevator access, baggage belts, or any type of control functionality.

An example of the operation of an embodiment of the system is as follows. Field devices (e.g., card readers, locks) are installed that control all access to a controlled area. Those field devices are connected to one or more personality modules. A user then uses client user interface to define Portals and Groups, including their logic scripts to define how the portal devices interact and operate. For instance, a portal may include Door 1, Lock 1, and logic script defining the conditions for unlocking Door 1. Using client user interface, the user further defines one or more clearance levels, which reflect the policies that dictate access grants (e.g., unlocking Door 1). The user further associates cardholders with respective cards that uniquely identify each cardholder to the system and assigns to each respective cardholder an appropriate clearance level. All of the information entered by the user is stored in database 204 and then passed to server 202. Server 202 parses the information and downloads it to the appropriate enclosures.

When the cardholder wants access to a controlled area, the card is presented to a reader for the door in question. If the reader is an intelligent display station, a PIN or other code may be requested in some embodiments. The personality module affiliated with the reader, using its PM Manager 209, looks up the cardholder in its locally stored clearance level information, compares the current date and time to the allowed dates and times, and then runs the appropriate script to either allow or deny access.

Because a system in accordance with an embodiment of the invention is primarily software based and because each enclosure includes its own operating system; accommodating additional user-desired third-party systems or components is relatively straightforward. Third-party systems or components are those systems or components developed by someone other than the vendor or developer of an access control system in accordance with an embodiment of the invention, and may include legacy systems or components. For instance, referring to FIG. 18, if a user desired to add a third-party Time and Attendance server 702 to the system, such a server could be connected to a personality module 314 and an application could easily be created to be stored at the enclosure and run by the PM Manager 209 to provide appropriate information to the Time and Attendance server (e.g., time in and time out of cardholders). In contrast, in conventional systems, any information relevant to a Time and Attendance server 702 is passed from a reader 110 to the server 102 and to a database where it is stored in accordance with specialized procedures, typically in some kind of table 704. Not only are there many more potential points of failure (e.g., at the reader panel 104, the server 102, the database 103), which is not usually acceptable when employee's payroll is involved (as it is with most Time and Attendance programs), but the Time and Attendance server 702 must continually poll the database 103 for new information, creating considerable overhead for the Time and Attendance Server. Alternatively, in a conventional system, all of the PROMs at all of the panels 104 controlling the readers could be physically changed out to allow direct interface to the Time and Attendance server. Such a measure, however, is less than desirable, and becomes an administrative nightmare for a vendor who has to provide such a service to many thousands of customers, when no two customers want exactly the same thing. But because a system in accordance with an embodiment of the invention is driven by software at each respective enclosure, download of such a program to each enclosure is a simple procedure that can be administered remotely. In other words, interfacing with these devices is a matter of software programming and not hardware design. Although a Time and Attendance server is described above, it is to be understood that such a server is exemplary only. A system in accordance with an embodiment of the invention could similarly accommodate virtually any user-desired third-party system, including servers, components, or applications.

Thus a system in accordance with an embodiment of the invention is a scalable, modular, and flexible system. It should be understood that such a system not only controls access through various doors and to various equipment, but, because of its use of a PLC can also control, through logic scripts, considerable aspects of a facility. For instance, such a system can be used to manage facility temperature and lighting. Accordingly, the system described herein is a "facilities management system," of which an "access control system" is just one type.

It should be understood that the particular embodiments described above are only illustrative of the principles of the present invention, and various modifications could be made by those skilled in the art without departing from the scope of the invention. Thus, the scope of the present invention is limited only by the claims that follow.

What is claimed is:

1. A system for facilities management, comprising:
   a server;
   a client in communication with the server, the client residing on a first operating system;
   multiple personality modules in communication with the server, the personality modules residing on a second operating system, each personality module assigned to interact with one or more distinct field devices wherein each personality module includes a personality manager for controlling said interaction;
   a user interface displayed on the client, the user interface designed to receive custom logic scripts from a user; and
   a virtual machine, incorporating a programmable logic controller, residing on each of the personality modules, the virtual machine designed to execute the custom logic scripts.

2. The system of claim 1, wherein the user interface is designed to receive portals defined by the user, the portals including the logic scripts.

3. The system of claim 2, where the portals further each include a respective set of selected field devices, inputs, and outputs.

4. The system of claim 1, wherein:
the personality modules each store logic scripts related to the modules assigned one or more field devices.

5. A system for facilities management, comprising:
a server;
an interface residing on a first operating system, the interface designed to receive customization information from a user, the customization information including logic scripts to be used in interacting with field devices; and
multiple virtual machines, each incorporating a programmable logic controller, for performing the logic scripts, each virtual machine residing on a personality module within a second operating system, each said personality module assigned to interact with one or more distinct field devices wherein a personality manager of each personality module controls said interaction.

6. The system of claim 5, wherein the first operating system and the second operating system are both in communication with the server.

7. The system of claim 5, wherein:
the customization information includes portals, wherein the portals include the logic scripts.

8. The system of claim 7, wherein the portals each further include a respective set of selected field devices, inputs, and outputs.

9. The system of claim 5, further including:
a display in communication with each personality module, wherein the interface is viewable on the display.

10. A method for use in an access control system, comprising:
providing a server;
receiving user-defined logic scripts through an interface residing on a client, the client residing on a first operating system, wherein the logic scripts define system access policies; and
performing the user-defined logic scripts with a plurality of virtual machines incorporating a programmable logic controller, each virtual machine residing on a second operating system of a unique personality module, each said personality module assigned to interact with one or more distinct field devices wherein a personality manager of each personality module controls said interaction.

11. The method of claim 10, wherein:
the step of receiving user-defined logic scripts includes receiving user-defined portals.

12. A machine-readable media for use in an access control system, the machine-readable media including instructions which when executed by one or more computers in an access control system cause the access control system to perform the steps of:
providing a server;
receiving user-defined logic scripts through an interface residing on a client, the client residing on a first operating system, wherein the logic scripts define system access polices; and
performing the user-defined logic scripts with a plurality of virtual machines incorporating a programmable logic controller, each virtual machine residing on a second operating system of a separate personality module each said personality module assigned to interact with one or more distinct field devices such that a personality manager of each personality module controls said interaction.

13. The machine-readable media of claim 12, wherein the step of receiving user-defined logic scripts includes receiving user-defined portals.

* * * * *